United States Patent
Surnilla et al.

(10) Patent No.: US 8,315,788 B2
(45) Date of Patent: Nov. 20, 2012

(54) METHOD AND SYSTEM FOR VEHICLE REFUELING

(75) Inventors: Gopichandra Surnilla, West Bloomfield, MI (US); Thomas G. Leone, Ypsilanti, MI (US); Krishnaswamy Venkatesh Prasad, Ann Arbor, MI (US); Apoorv Agarwal, Clarkston, MI (US); Brett Stanley Hinds, Clarkston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 12/783,446

(22) Filed: May 19, 2010

(65) Prior Publication Data

US 2011/0137470 A1  Jun. 9, 2011

(51) Int. Cl.
*G06F 19/00* (2006.01)
(52) U.S. Cl. ........................................................ 701/123
(58) Field of Classification Search .................. 701/29.5, 701/31.5, 32.3, 32.4, 32.5, 33.4, 123
See application file for complete search history.

(56) References Cited

U.S. PATENT DOCUMENTS

| | | | |
|---|---|---|---|
| 5,170,363 A | 12/1992 | Hirota et al. | |
| 5,668,310 A | 9/1997 | Parkman et al. | |
| 7,219,539 B1 | 5/2007 | Bauerle | |
| 2006/0101823 A1 | 5/2006 | Takemoto et al. | |
| 2006/0293849 A1 | 12/2006 | Baldwin | |
| 2008/0028851 A1 | 2/2008 | Moening et al. | |
| 2009/0070008 A1 | 3/2009 | Batenburg et al. | |
| 2009/0109022 A1 | 4/2009 | Gangopadhyay et al. | |
| 2009/0255508 A1 | 10/2009 | Cheiky | |
| 2009/0292443 A1 | 11/2009 | Stein et al. | |
| 2009/0292444 A1 | 11/2009 | Russell | |
| 2010/0004853 A1 | 1/2010 | Siereveld et al. | |
| 2010/0198481 A1* | 8/2010 | Bromberg et al. | 701/102 |
| 2011/0144839 A1* | 6/2011 | Pudar | 701/22 |

OTHER PUBLICATIONS

Stein, Robert A. et al., "Optimal Use of E85 in a Turbocharged Direct Injection Engine," 2009, SAE Technical Paper No. 2009-01-1490, 13 pages.
Surnilla, Gopichandra et al., "Method and System for Controlling Fuel Usage," U.S. Appl. No. 12/846,716, filed Jul. 29, 2010, 77 pages.
Surnilla, Gopichandra et al., "Method and System for Controlling Fuel Usage," U.S. Appl. No. 12/846,725, filed Jul. 29, 2010, 75 pages.
Leone Thomas G., "Method and System for Controlling Fuel Usage," U.S. Appl. No. 12/846,730, filed Jul. 29, 2010, 73 pages.
Surnilla, Gopichandra et al., "Method and System for Controlling Fuel Usage," U.S. Appl. No. 12/846,735, filed Jul. 29, 2010, 74 pages.
Leone Thomas G. et al., "Method and System for Controlling Fuel Usage," U.S. Appl. No. 12/846,738, filed Jul. 29, 2010, 76 pages.

\* cited by examiner

*Primary Examiner* — Kim T Nguyen
(74) *Attorney, Agent, or Firm* — Julia Voutyras; Alleman Hall McCoy Russell & Tuttle LLP

(57) ABSTRACT

Methods and systems are provided for facilitating refueling operations in vehicles operating with multiple fuels. A vehicle operator may be assisted in refueling the multiple fuel tanks of the vehicle by being provided one or more refueling profiles that take into account the vehicle's future trip plans, the predicted environmental conditions along a planned route, and the operator's preferences.

18 Claims, 4 Drawing Sheets

METHOD AND SYSTEM FOR VEHICLE REFUELING

GOVERNMENT LICENSE RIGHTS

This invention was made with government support under Agreement DE-FC26-07NT43276, awarded by the Department of Energy. The government has certain rights in this invention.

FIELD

The present description relates generally to methods and systems for smart fueling of vehicle fuel tanks.

BACKGROUND/SUMMARY

Engines operating with variable fuels, such as flex-fuel engines, may have more than one fuel system, and thus more than one fuel tank. For example, engines may be configured with a dual fuel system including two fuel tanks for two varieties of fuels, such as gasoline and an ethanol fuel. Such systems, however, require a vehicle operator to keep track of each fuel's usage, fuel levels in each tank, and to fill each tank accordingly.

Accordingly, various approaches have been developed for assisting vehicle operators in refueling fuel tanks of vehicles with multiple fuel systems. One example approach is illustrated by Cheiky in US 2009/0255508. Therein, a smart fueling system computes various fueling options for the vehicle operator at a filling station. Specifically, the smart fueling system may communicate with the fueling pump and determine a refueling mixture based on the fuel options available at the pump, the level of fuel in each vehicle fuel tank, and the vehicle's operating conditions.

However, the inventors herein have recognized potential issues with such an approach. As one example, the refueling options may be biased towards the fueling options available at the fueling station. As another example, the refueling options presented may not take into account the different rates of fuel usage based on each fuel's properties. For example, a driver who prefers fuel economy may be provided with a higher amount of ethanol fuel and a lower amount of gasoline fuel due to the presence of more ethanol fueling options at the fueling station. Consequently, due to ethanol fuel's lower heating value, engine fuel economy may be degraded. In another example, a driver who prefers high engine performance may be provided with a lower amount of ethanol fuel and a higher amount of gasoline fuel due to the presence of fewer ethanol refueling options at the fueling station. Consequently, due to a reduction in the availability of ethanol fuel, the driver may have reduced access to the charge cooling effects of ethanol, and thus engine performance may be degraded.

As another example, the refueling options presented may not take into account environmental conditions, or account for different fuel usage rates of different fuels under different environmental conditions. These may include environmental conditions prevalent along the vehicle's travel route when refueling is requested, as well as predicted environmental conditions related to a future trip plan (such as a destination and travel route planned immediately following the refueling). The environmental conditions may include, for example, humidity, temperature, altitude, weather predictions (such as, rain or snow predictions), etc. Similarly, the refueling may be based on an average vehicle drive history, which may be substantially different from the vehicle's trip plan following refueling. Thus, a refueling profile based on the drive history may not be optimal for the drive plan following refueling. For example, the drive history may be based on driving at areas with a higher humidity and/or a lower altitude. Under such conditions, an ethanol fuel may be used at a lower rate. Following refueling, the vehicle may be driven in an area with a lower humidity and/or at a higher altitude, where a higher rate of ethanol fuel usage may be anticipated. Thus, a refueling profile based on the average drive history and average environmental conditions may lead to a faster depletion of the ethanol fuel following refueling. As such, this may lead to degraded engine performance after refueling. Furthermore, the fuel tank may need to be refilled earlier than anticipated.

Thus, in one example, some of the above issues may be addressed by a method of selectively fueling a vehicle including a first fuel tank with a first fuel and a second fuel tank with a second, different, fuel. In one embodiment, the method may comprise, displaying a fueling profile to a vehicle operator, the fueling profile based on predicted future environmental conditions of a vehicle trip plan.

In one example, a vehicle may include a dual fuel system with a first fuel tank storing a first fuel and a second fuel tank holding a second, different, fuel. A refueling indication may be automatically provided when a fuel level in one or both fuel tanks falls below respective threshold levels. Alternatively, a vehicle operator may communicate a refueling request to the engine controller through a user interface, such as an interactive display device, on the vehicle dashboard. In response to the refueling request, the engine controller may display one or more fueling profiles to the vehicle operator (for example, on the display device), based at least on engine operating conditions and environmental conditions. Specifically, the controller may anticipate a fuel usage rate for the different fuels in the multiple fuel system based on the environmental conditions and properties of the fuel. In one example, the first fuel tank may store a first fuel with a lower effective octane, such as gasoline, while the second fuel tank may store a second fuel with a higher effective octane, such as ethanol. Herein, the displayed fueling profiles may anticipate the likelihood of engine knock based on the vehicle's travel plan and the environmental conditions at the destination and along the planned route. Further, the displayed fueling profiles may take into account the charge cooling properties and knock mitigating effects of ethanol fuels, and anticipate fuel usage rates for the ethanol fuel and the gasoline fuel accordingly. In another example, the displayed fueling profile may take into account an anticipated amount of boost usage based on the vehicle's travel plan and predicted future environmental conditions, and adjust a fuel usage rate for the ethanol fuel and the gasoline fuel based on the effect of ethanol fuel on boost performance. The fueling options displayed may be further based on operator indicated preferences and constraints (such as monetary constraints for the cheapest fueling option, or time constraints for the closest fueling option), engine operating conditions, vehicle loads (e.g., trailer towing loads or other loads), driver performance history (e.g. fuel economy-driven or performance-driven), driver aggressiveness, terrain (e.g., hill, gradients, road grade, etc.), etc.

In one example, the displayed fueling profiles may include details such as fuel type, a fuel ratio between the fuels to be received (such as, a ratio between fuel volumes added in each tank), fuel octane content of the received fuels, etc. Each fueling profile may further include details of one or more fueling stations (where fuel according to the fuel type, fuel ratio etc. of the corresponding fueling profile can be received), as well as directions to direct the vehicle to the fueling station. An operator may select a fueling station from the displayed fueling stations based on the selected fueling profile. Thus, a fueling station may be chosen such that it is capable of providing fuel according to the selected fuel profile, thereby enabling the vehicle operator to take advantage of each fuel's attributes while also providing the requested engine performance. Further, if the selected fueling station is capable of smart refueling, the fueling profile may be communicated to the fueling station (for example, through wireless communication), and information regarding a fuel type of a received fuel may be received from the fueling station and displayed to the operator during the refueling operation.

In this way, a fueling system may facilitate refueling operations by reducing the amount of operator effort required. By displaying fueling profiles that take into account vehicle operating conditions, vehicle performance history, vehicle travel plans, and environmental conditions, vehicle refueling operations may be simplified for a vehicle operator, and may be performed with minimal operator input, without affecting vehicle performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
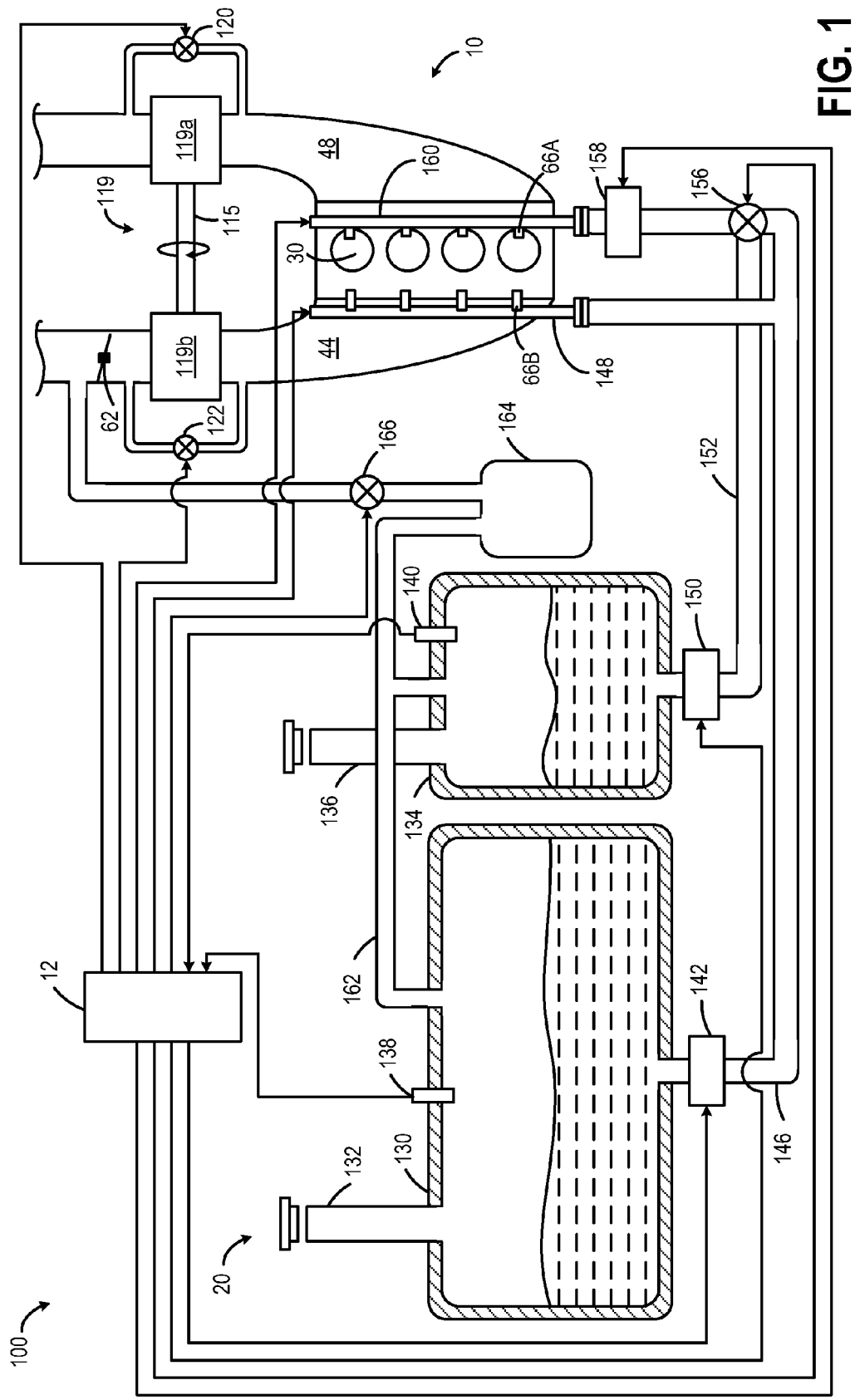
FIG. 1 shows an example embodiment of a dual fuel engine system.
Figure 2:
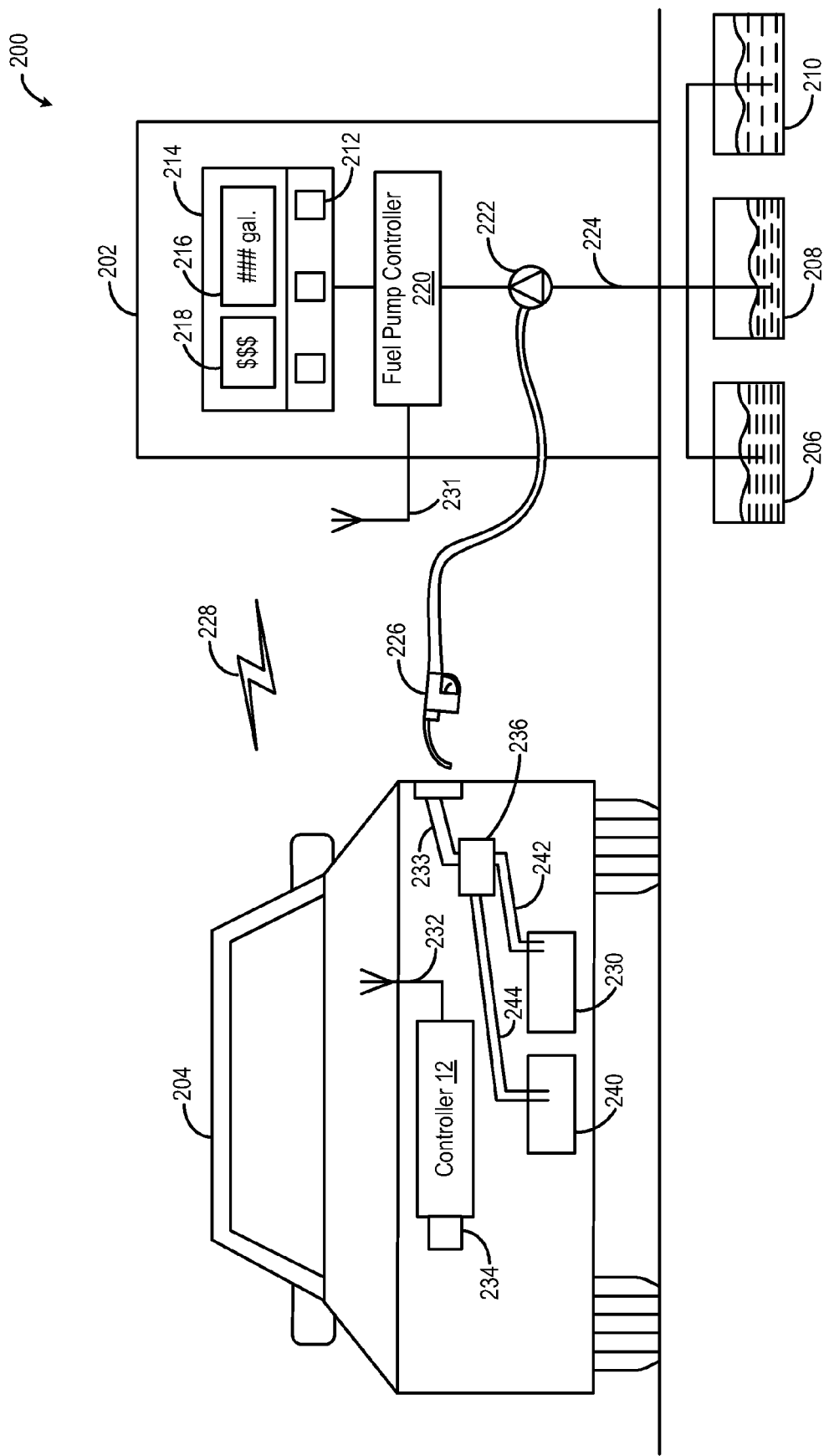
FIG. 2 shows an example embodiment of a smart engine fueling system.

The following description relates to systems and methods for fueling a vehicle engine system with multiple fuel tanks, such as the dual fuel engine system of FIG. 1, at a fueling station, such as the fueling station of FIG. 2. In response to a refueling request by the vehicle operator, or when the fuel level of at least one fuel tank is below a predetermined threshold, an engine controller may display one or more fueling profiles for a subsequent fueling operation. The fueling profiles may be based at least on predicted future environmental conditions (such as temperature, altitude, humidity, etc.) of a vehicle trip plan (such as a trip planned immediately after the fueling operation). For example, the displayed fueling profiles may compensate for fuel usage rates taking into consideration each fuel's attributes and properties under the predicted environmental conditions. The displayed fueling profiles may be further based on a vehicle's travel history, operator indicated cost functions and preferences, additional predicted conditions, etc. The fueling profiles may include, for example, suggestions for fuel types for each fuel tank, a ratio of fuels for each tank, fueling stations capable of providing fuel according to a selected fuel profile, and directions to the refueling station. An engine controller may be configured to perform control routines, such as the routine of FIG. 3, to display one or more fueling profiles for the vehicle system to a vehicle operator through an interactive display device, such as a display device on a vehicle dashboard, as shown in FIG. 4. Further, if the selected fueling station pump is enabled with wireless communication (e.g., a smart pump), a selected fueling profile may be relayed to the fueling station to facilitate receipt of fuel according to the selected fueling profile. During the fueling operation, the controller may also receive information pertaining to the received fuel (e.g., fuel type, brand, amount, cost, etc) and display the details to the vehicle operator. In some examples, one or more control valves of the fuel system may be adjusted based on the fuel type indication of the received fuel so as to facilitate directing of the received fuel to the appropriate fuel tank. In this way, refueling operations of a vehicle engine system may be facilitated for a vehicle operator.

FIG. 1 illustrates an example dual fuel engine system 100 configured with an engine 10 and a fuel system 20. Engine 10, as depicted, has four in-line cylinders 30, although alternate cylinder configurations may be possible. In one embodiment, engine 10 may have a turbocharger 119, with turbine 119a coupled in exhaust manifold 48 driving compressor 119b coupled in intake manifold 44. An intercooler (not shown) may optionally be included to cool the compressed intake air charge. Turbine 119a may be coupled to compressor 119b via drive shaft 115. Various types of turbochargers and arrangements may be used. For example, a variable geometry turbocharger (VGT) may be used where the geometry of the turbine and/or compressor may be varied during engine operation by controller 12. Additionally or optionally, a variable nozzle turbocharger (VNT) may be used wherein a variable area nozzle is placed upstream and/or downstream of the turbine in the exhaust line (and/or upstream or downstream of the compressor in the intake line) for varying the effective expansion or compression of gasses through the turbocharger. Still other approaches may be used for varying expansion in the exhaust, such as with a waste-gate valve. FIG. 1 shows an example bypass valve 120 around turbine 119a and an example bypass valve 122 around compressor 119b, where each valve may be controlled via controller 12. In alternate embodiments, a twin turbocharger arrangement, a sequential turbocharger arrangement, or a supercharger may be used, as desired.

Fuel system 20 may deliver one or more different types of fuel to engine 10 via port fuel injection (PFI) fuel injectors 66B and/or direct injection (DI) fuel injectors 66A. The different fuel types may include fuels with different octanes, different heats of vaporization, different concentrations of a gasoline/alcohol mixture, combinations thereof, etc.

In the illustrated embodiment, an example fuel system configuration is shown where a separate fuel pump and tank is provided for a first and second fuel type. Specifically, a first fuel tank 130 is shown for holding a first fuel, such as a first liquid fuel of a first fuel type. First tank 130 may receive the first fuel via filler tube 132. Likewise, a second fuel tank 134 may be included to hold a second fuel, such as a second liquid fuel of a second fuel type, the second fuel received via filler tube 136. The second fuel may be different from the first fuel. In one example, the second fuel may have a higher octane content than the first fuel. In one example, the first fuel is primarily gasoline, while the second fuel is primarily ethanol, or an ethanol fuel blend such as E85 (that is, an ethanol-gasoline fuel blend with approximately 85% ethanol and 15% gasoline). However, other fuel types may also be used. For example, the dual fuel system may include diesel and gasoline, or CNG and diesel. In still another example, the different fuel types may be ethanol fuel blends with varying ethanol content, such as E50 and E85. It will be appreciated that in some cases both the first and second fuel tanks may hold the same type of liquid fuel.

The fuel level in fuel storage tanks 130 and 134 may be determined by controller 12 using sensor measurements. For example, sensor 138 may measure the fuel storage tank pressure of fuel storage tank 130 and a liquid fuel level of the first type of fuel may be derived from that pressure measurement. Likewise, sensor 140 may measure the fuel storage tank pressure of fuel storage tank 134 and a liquid fuel level of the second type of fuel may be derived from that pressure measurement. As another example, in some embodiments, a liquid fuel level measuring device (not shown) that floats on the surface of the liquid fuel in the tank may determine the volume of liquid fuel in the tank. It will be appreciated that an indication of the liquid fuel level may be provided to the driver based on a determination via measurement, calculation, or combination thereof. Controller 12 may generate a fuel level reading that may range between a full fuel storage tank and an empty fuel storage tank based on the received measurements and/or the determination. The indication may be displayed to the vehicle operator via a fuel level indicator (not shown) that may be used by the vehicle operator for fuel storage tank refilling purposes.

Fuel system 20 further includes fuel vapor canister 164 that connects to fuel storage tanks 130 and 134 via vent pipe 162. Fuel vapor canister 164 may trap fuel vapor flowing into the canister while allowing air filtered through the canister to be vented to the atmosphere via an air vent (not shown). In some embodiments, the fuel vapor canister may filter fuel vapor with charcoal. The fuel vapor may adhere to the charcoal until the fuel vapor is purged.

Fuel vapor may be intermittently purged from fuel vapor canister 164 via purge valve 166 actuated by controller 12. Fuel vapor may be purged from the fuel vapor canister using engine vacuum created during engine operation. In one example, engine vacuum may be created by actuating throttle valve 62 and upon actuation of purge valve 166. Fuel vapor may accordingly travel from fuel vapor canister 164 into the intake manifold and enter cylinders of engine 10 for combustion. By introducing fuel vapor into the cylinder and not into the atmosphere, fuel economy may be improved and emissions may be reduced. In some configurations, each fuel storage tank may have a separate vapor passage in communication with a shared fuel vapor canister. Further, in some configurations each fuel storage tank may have a separate fuel vapor passage in communication with a separate fuel vapor canister.

A first fuel (such as, gasoline) may be pumped from fuel storage tank 130 into passage 146 via pump 142. Passage 146 may lead to PFI injectors 66B via fuel rail 148 for port injection of the first fuel type to cylinders of engine 10 in what may be referred to as the port injection system. Further, passage 146 may lead to valve 156. In some embodiments, valve 156 may be a solenoid valve. A second fuel (such as, an ethanol fuel blend) may be pumped from fuel storage tank 134 into passage 152 via low pressure pump 150. Passage 152 may lead to valve 156. Valve 156 may be actuated by controller 12 to selectively supply the first fuel from first fuel tank 130 or the second fuel from second fuel tank 134 to high pressure pump 158 which may provide fuel to DI fuel injectors 66A via fuel rail 160 for direct injection of the first or second fuel to cylinders of engine 10 which may be referred to as the DI system. By selectively supplying each of the different fuel types to the DI fuel injectors, different combustion modes may be performed throughout engine operation that take advantage of the properties of the different types of fuel. For example, gasoline may be directly injected in a stratified combustion mode during engine startup in order to quickly warm up an emissions control device. As another example, ethanol may be directly injected during high engine loads to reduce engine knock. Alternatively, different fuel types may be directed to the different fuel injectors based on the level of the various fuels in the respective fuel tanks. In this way, operating efficiency may be improved and emissions may be reduced over the range of engine operation. In one specific example, in response to knock, increased direct injection of ethanol may be provided to abate the knock.

While low pressure pumps 142 and 150 are shown outside the respective fuel storage tanks, in an alternative example one or both of the pumps may be located within the respective fuel storage tanks. Further, the fuel systems may have different characteristics, such as different size tanks, different size pumps, different pump capacity, different pump pressure, different pump maximum flows, different on/off cycles (e.g., pump 150 may run more intermittently than pump 142), etc. Note, in some examples, only one pump may operate under some conditions. For example, if fuel from fuel tank 134 is not needed, or not enabled (e.g., during cold start conditions), pump 150 may be deactivated (or not activated) while pump 142 operates. In this way, less battery power may be used, and less fuel vapors may be generated.

In some embodiments, the fuel system may include passages from both the first and second fuel tanks that may be used to selectively supply fuel to the PFI fuel injectors via actuation of one or more control valves. In such a configuration, different types of fuel may be supplied to the PFI fuel injectors. In some embodiments, the fuel system may include passages connecting the first fuel storage tank and the second fuel storage tank to enable fuel to be transferred between the first and second fuel storage tanks. For example, if the second fuel storage tank is empty, gasoline in the first fuel storage tank may be pumped into the second fuel storage tank. Optionally (or alternatively), fuel may be transferred between various regions of the fuel system via gravity.

In some embodiments of fuel system 20, each fuel tank may include separate fuel delivery and return lines controlled by different control valves. By actuating the different control valves, the controller may control delivery of fuel from the respective fuel storage tanks to high pressure pump 158 and the DI system. In some embodiments, the fuel system may include, for the fuel storage tanks, a returnless-type fuel system, a return-type fuel system, or combinations thereof.

In some embodiments, fuel system 20 may be configured to receive a blended liquid fuel and substantially separate two or more different types of liquid fuels from the blended liquid fuel into the fuel storage tanks. For example, fuel system 20 may receive a blended liquid fuel (e.g., E85) via a filling tube into a separator (not shown) wherein the fuel may be separated and from where a first fuel type may be supplied to the first fuel storage tank 130 via a dedicated passage and a second fuel type maybe supplied to second fuel storage tank 134 via a dedicated passage. In one example, E85 is supplied to the fuel system and the fuel separator separates gasoline and ethanol from an E85 blend and the gasoline is supplied to the first fuel storage tank and the ethanol is supplied to the second fuel storage tank.

In some embodiments, the fuel separator may be positioned at the exit of a fuel storage tank storing a blended fuel and the separator may separate the blended fuel into different types of fuel. Alternatively, the fuel system may include a primary fuel storage tank with a fuel separation layer and the different types of fuels may be separated into different regions of the primary fuel storage tank. In still other embodiments, the second fuel tank may be a bladder within the first fuel tank to enable a finer control of fuel separation.

It will be appreciated that various fuel supply regulating components discussed above may be included in a fuel supply control device. In one example, one or more of the fuel pumps and valves regulating flow in the fuel supply passages may be included in the fuel supply control device.

Now turning to FIG. 2, a fueling system 200 is depicted. The fueling system includes a fueling station 202 for refilling fuel in one or more fuel tanks 230, 240 of vehicle 204. In one example, as shown, vehicle 204 may be configured with the dual fuel engine system of FIG. 1.

Fueling station 202 may store and dispense one or more fuels in accordance with a requested fueling profile. For example, fueling station 202 may store a first fuel in first fuel reservoir 206, a second fuel in second fuel reservoir 208, and a third fuel in third fuel reservoir 210. It will be appreciated that while the depicted example illustrates the fuel station storing and dispensing three fuels, in alternate embodiments, more or fewer fuel options may be available. A user may communicate a desired fueling profile, including a selection of fuels, and an amount of each selected fuel using buttons 212, or corresponding touch-sensitive areas, on fuel sales display 214. Display 214 may include sub-displays providing fuel sales related information, such as an indication of a volume of a selected fuel being filled in volume sub-display 216, and a cost of the selected fuel being dispensed in cost sub-display 218. Additional displays, while not shown, may be included representing sales information such as the composition of fuel being dispensed, how long the dispensing will take, fuel brand, etc.

Based on the user-communicated fueling profile received on sales display 214, fuel pump controller 220 may operate fuel pump 222 and pump an appropriate amount of fuel from the appropriate fuel reservoir 206, 208, 210. As depicted, the requested amount of fuel may be drawn from fuel reservoir 206, 208, 210 and delivered to fueling pump nozzle 226 via a common fuel line 224. However, in alternate embodiments, each fuel reservoir 206, 208, 210 may be connected to fueling pump nozzle 226 through distinct fuel lines and distinct fuel pumps.

In one example, as depicted, fueling station 202 may be a smart fueling station wherein fuel pump controller 220 can receive the requested fueling profile from a vehicle operator via wireless communication 228 through fueling station wireless communication device 231. The requested fueling profile may be transmitted to the fueling station by vehicle engine controller 12 via vehicle wireless communication device 232.

As elaborated herein with reference to FIG. 3, engine controller 12 may suggest and display one or more fueling profiles for the engine's fuel system in response to a fuel level in one or more of the fuel tanks falling below a threshold and/or in response to an operator refueling request. The displayed fueling profile may include, without being limited to, a fuel type to be refilled in each tank, an fuel amount to be refilled, a fuel ratio between the different fuels, a location of one or more fueling stations wherein refueling according to the displayed fuel profile may be performed, and directions to each of the one or more fueling stations. The displayed fueling profiles may be based on predicted future environmental conditions of a vehicle trip plan. The fueling profiles may be further based on vehicle and engine operating conditions, prevalent environmental conditions, other predicted conditions (such as drive aggressiveness, road grade, trailer or other load during the vehicle trip plan), navigational inputs (such as from a vehicle positioning device 234), fuel usage rates anticipated based on the inputs and based on each fuel's properties, as well as operator preferences (such as best available fuel economy, lowest $CO_2$ emissions, best available cost efficiency, etc.).

The displayed fueling profiles may be displayed on an interactive display device, such as a display device on the vehicle dashboard. In one example, where a selected fueling station is enabled with wireless communication (such as a "smart pump"), the selected fueling profile may be communicated by controller 12 to fuel pump controller 220, which may then draw fuel from the reservoirs accordingly. Controller 12 may additionally assist in directing the received fuel to the respective fuel tanks. For example, pumped fuel may be delivered by fueling pump nozzle 226 into vehicle 204 along filling tube 233 into fuel sorting system 236. Fuel sorting system 236 may include, for example, a fuel separator (not shown), one or more fuel sensors (such as a water sensor or ethanol sensor), and one or more control valves (not shown) for diverting the received fuel to the appropriate one of first fuel tank 230, along first fuel refueling pipe 242, and/or to second fuel tank 240, along second fuel refueling pipe 244.

In one example, the selected fueling profile may include a first amount of gasoline and a second amount of an ethanol-blend fuel, such as E85. The selected fueling profile may be wirelessly communicated to fueling station 202. At fueling station 202, initially the first amount of gasoline may be pumped from first reservoir 206 and delivered to the vehicle through fueling pump nozzle 226. Details of the first pumping operation (such as, volume, cost, fuel type, etc.) may be wirelessly relayed by the fuel pump controller 220 to the engine controller 12 during the refueling operation. The engine controller 12 may then display the details of the refueling operation to the vehicle operator. Based on the details of the fueling operation, one or more control valves of the fuel system may be adjusted so as to direct the received fuel to the appropriate tank. For example, during the first pumping operation of the first gasoline fuel, a control valve directing the received fuel to second fuel tank 240 may be closed while a control valve directing the received gasoline fuel to first fuel tank 230 may be opened. When the requested amount of gasoline fuel has been pumped, fuel pump controller 220 may start pumping and delivering the requested volume of E85 from second reservoir 208 through fueling pump nozzle 226. The fuel pump controller 220 may wirelessly relay details of the second pumping operation to engine controller 12. Additionally, or optionally, the ethanol sensor of fuel sorting system 236 may sense and confirm that ethanol is present in the received fuel (and further, an amount of ethanol in the ethanol fuel blend received), and may communicate the same to controller 12. During the second pumping operation of the second ethanol fuel, a control valve directing the received ethanol fuel to second fuel tank 240 may be opened while a control valve directing the received fuel to first fuel tank 230 may be closed.

While the above-mentioned example suggests the use of single control valves for each fuel tank, it will be appreciated that in alternate examples, the control valves in the fuel sorting system may be 3-way valves. Alternatively, various combinations of multiple valves and sub-tanks may be used to enable finer control of the amount of first and second fuel (e.g., gasoline and E85) received and sorted between the fuel tanks.

In one example, during refueling at the fueling station, a fuel type of the received fuel may be received wirelessly from the fueling station. When the first fuel is received, the first fuel type may be displayed to the vehicle operator, and further a first control valve coupled to the first fuel tank may be opened while closing a second control valve coupled to the second fuel tank. Then, when the second fuel is received, the second fuel type may be displayed to the vehicle operator. Further, the second control valve coupled to the second fuel tank may be opened while closing the first control valve coupled to the first fuel tank.

Figure 3:
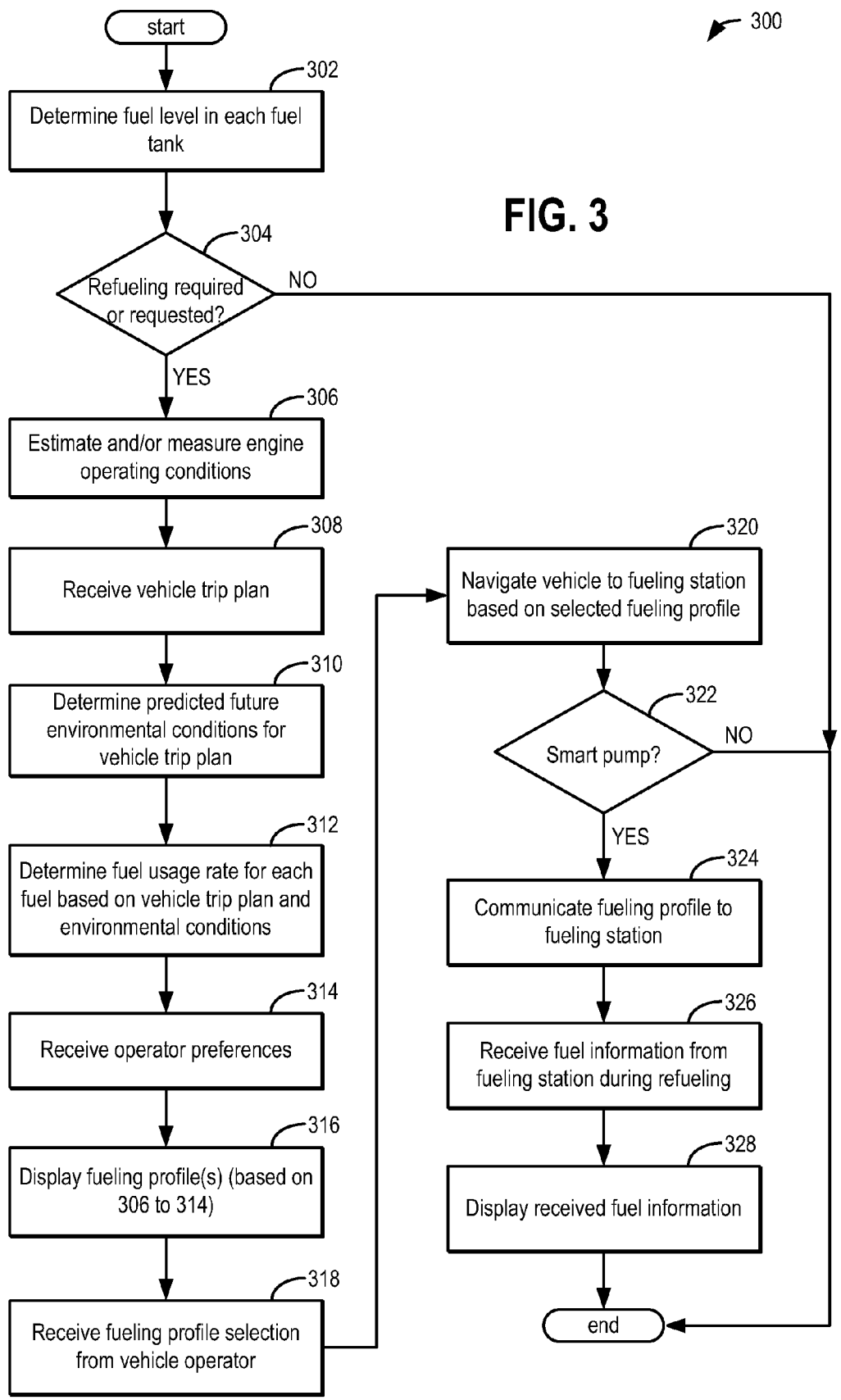
FIG. 3 shows a high level flow chart for refueling the engine system of FIG. 1 using the smart engine fueling system of FIG. 2, according to the present disclosure.
Figure 4:
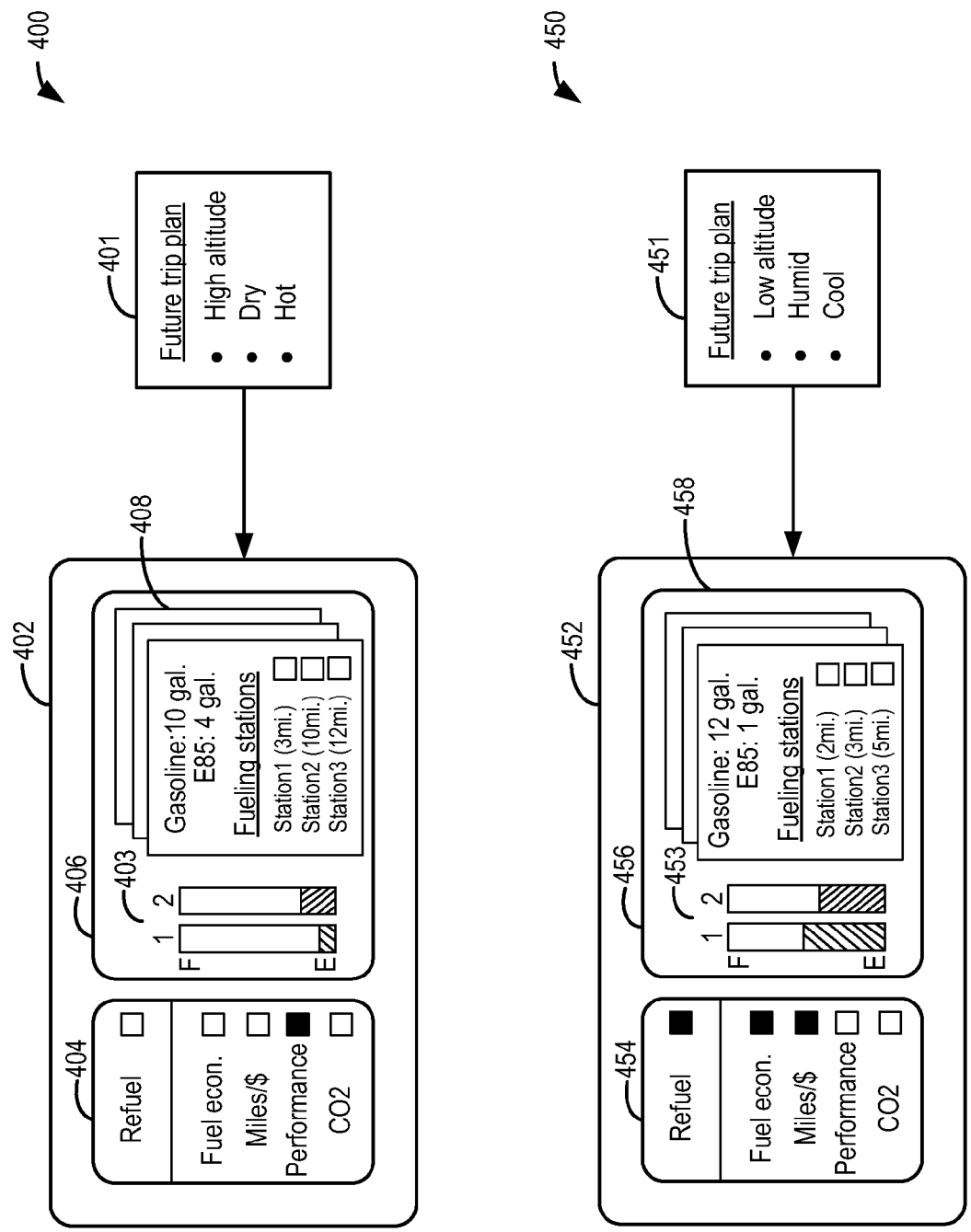
FIG. 4 shows example fueling profile displays.

Now turning to FIG. 3, an example routine 300 is depicted for refueling the engine system of FIG. 1 at a fueling station, such as the station of FIG. 2. By suggesting and displaying one or more fueling profiles, including details of possible fueling stations, to a vehicle operator when a fuel level in a fuel tank falls below a threshold and/or in response to an operator refueling request, refueling operations for engine systems operating on variable fuels and with multiple fuel tanks can be made easier for vehicle operators.

At 302, the routine may include determining a fuel level in each fuel tank. In one example, the fuel level in each fuel tank may be inferred from a fuel tank pressure as estimated by a fuel tank pressure sensor (such as sensors 138, 140 in FIG. 1). Alternatively, the fuel level in each tank may be determined by a fuel level sensor (such as a float-based sensor). At 304, it may be determined whether refueling is required and/or whether refueling has been requested by the vehicle operator. In one example, wherein the fuel system is a dual-fuel system, selectively refueling may be performed in response to a fuel level in a first fuel tank falling below a first threshold and/or a fuel level in the second fuel tank falling below a second threshold. The threshold at which a refueling request is triggered for each fuel tank may be distinct and based on the fuel type, fuel usage history, vehicle operating conditions, etc. For example, a higher threshold may be used for the primary fuel in the primary fuel tank and a lower threshold may be used for the secondary fuel in the secondary fuel tank. In one example, where the two fuel tanks of a dual-fuel system house gasoline and E85, a higher threshold may be used for a gasoline fuel and a lower threshold may be used for E85. However, in alternate embodiments, the same threshold may be used for both fuel tanks.

In another example, selectively refueling may be performed in response to the vehicle operator requesting refueling. As such, the vehicle operator may request refueling even though the fuel levels in the tanks are not below, or close to, respective thresholds due to time, monetary, or other constraints. The vehicle operator may indicate a desire to refill the tanks by selecting a refill button on a vehicle control panel, or through interactions with an interactive display device, for example.

At 306, in response to the refueling request, engine operating conditions may be estimated and/or measured. These may include, engine speed, torque, engine temperature, relative usage of the two fuels, etc. Engine operating conditions may be evaluated over a pre-determined interval before refueling, for example the interval since last refueling or since last engine start, or for a fixed distance or time. Evaluation of engine operating conditions may be quantitative, or may be summarized in general categories such as mild, medium, aggressive, towing, frequent knock, etc.

At 308, a vehicle trip plan may be received. The trip plan received may be for one or more vehicle trips planned in the future. For example, the received trip plan may be regarding a vehicle trip intended immediately following the refueling operation. Receiving a vehicle trip plan may include, for example, receiving navigational inputs from a vehicle positioning device (such as a GPS device) including a current position of the vehicle, recent direction of travel, environmental information pertaining to the current and expected position of the vehicle, information pertaining to terrain, grade, altitude, and expected traffic, real-time traffic information, alternate routes available in case of congestion, etc. Trip plans may also be inferred, for example based on recent direction of travel, and/or based on previous history of travel from the current location.

At 310, based on the vehicle trip plan and navigational inputs received from the vehicle positioning device in the vehicle, predicted future environmental conditions for the vehicle trip plan may be determined. The predicted future environmental conditions may include one or more of an ambient temperature, ambient altitude, road grade, ambient pressure, ambient humidity, and weather conditions at the destination and along the planned travel route. Additional environmental inputs may include, for example, average and/or forecasted temperatures, average and/or forecasted humidity levels, and forecasted weather (such as a risk of rain, snow, storms, etc.). For example, the routine may determine a likelihood of knock limits being encountered during the vehicle trip plan based on the predicted future environmental conditions, and based on the potential for knock, determine a future predicted usage rate of a secondary fuel, such as directly injected ethanol, which can be used to abate knock and avoid limiting engine spark advance due to environmentally created knock limits. Because the vehicle can selectively adjust the ratio of gasoline and ethanol injection with respect to one another in real time, different desired amounts of the different fuels to be used over the future trip plan may be scheduled taking into account the future environmental conditions. For example, if the trip plan calls for mountainous driving in dry weather, a greater amount of ethanol may be used over the trip, than for a plan that calls for driving in wet weather over generally flat terrain. As such, as described below, the routines may generate different requested fuel filling amounts to be provided at the filling station.

Specifically, at 312, fuel usage rates for each of the fuels in the fuel tanks may be determined. For example, for a dual-fuel system, the fuel usage rates of the first and second fuel may be adjusted based at least on the predicted environmental conditions of the vehicle trip plan, and the navigational and environmental inputs received earlier. At 314, operator preferences may be received. Operator preferences may include, for example, a preference for increased vehicle performance, a preference for increased fuel economy, a preference for reduced vehicle fueling and/or operational costs (that is, most miles per dollar spent), and/or preference for reduced vehicle exhaust emissions (such as lowest $CO_2$ emissions), etc. In one example, a customer may prefer fuel economy over exhaust emissions. In another example, the customer preferences may be weighted. For example, a customer may weigh a preference for fuel economy more heavily than a preference for lowest exhaust emissions.

Operator preferences and inputs may be received from the vehicle operator through an interactive display device, such as display on the vehicle dashboard for interacting with the vehicle operator, or a control panel on the vehicle display. Alternatively operator preferences may be inferred based on previous driving behavior, for example aggressive drivers may be assumed to prefer higher engine performance. At 316, one or more fueling profiles may be suggested and displayed. The fueling profiles may be displayed on the same interactive display that receives the operator preferences.

The one or more fueling profiles may be based at least on the predicted future environmental conditions of the vehicle trip plan. Specifically, fuel usage rates may be adjusted based on the predicted future environmental conditions, and the displayed fueling profiles may be based on the fuel usage rates of the fuels. In one example, the vehicle fuel system may be a dual fuel system with a first fuel injector coupled to a first fuel tank with a first fuel, and a second fuel injector coupled to a second fuel tank with a second fuel. For example, the first injector may be a port injector while the second injector may be a direct injector. Additionally, the second fuel may be a primarily ethanol fuel with a higher effective octane, while the first fuel may be a primarily gasoline fuel with a lower effective octane. Adjusting the fuel usage rates based at least on the environmental conditions may include, for example, increasing a usage rate of the ethanol fuel and increasing a refueling of the second tank as the ambient temperature increases, the ambient altitude increases, the ambient pressure decreases, and/or the ambient humidity decreases.

The displayed fueling profiles may be further adjusted based on navigational inputs, environmental inputs, operator preferences, and other inputs received at 306-314. Additional inputs that may be used to suggest fueling profiles may include other predicted conditions, such as driver aggressiveness, road grade, trailer or other load, and customer inputs, such as an indication of a towing load and payload details. The other predicted conditions may be based on a recent history of driver behavior, a recent history of relative usage of the two fuels, etc. For example, the vehicle operator may indicate that a trailer is being towed and accordingly a weight of the trailer being towed may be calculated (for example based on the payload details), and used to adjust fuel usage rates. Adjusting the fueling profile based on the other predicted conditions may include, for example, increasing a usage rate of the ethanol fuel as the driver aggressiveness increases, the road grade increases, or the trailer or other load increases. A performance history of the vehicle may also be used to adjust the fuel usage rates. For example, an engine controller may maintain a database of vehicle operations over a predefined duration or number of engine operations. Based on the database, it may be determined whether the vehicle operator has a tendency to drive more aggressively and be engine-performance driven, or whether the vehicle operator has a tendency to drive less aggressively with a preference for fuel economy. In another example, it may be determined whether the vehicle operator uses boosting frequently or not. Other vehicle operating parameters may also be tracked.

Each of the one or more displayed fueling profiles may include details such as a fuel type, a fuel amount, a fuel ratio between the fuels (such as, a ratio between a first fuel and a second fuel), one or more fueling stations (where fuel according to a selected fueling profile can be received), and directions to each of the one or more fueling stations. Additionally the fueling profiles may include information related to the fueling stations, such as, location of fueling stations in the vicinity, fuels available at the identified fueling stations, cost of individual fuels at the identified fueling stations, etc.

At 320, the vehicle may be navigated to a selected fueling station. In one example, at 318 the fueling station may be selected by the vehicle operator from the one or more displayed fueling stations based on the fueling profile previously selected by the operator from the one or more displayed fueling profiles. For example, the operator may select a fueling station based on cost preferences (such as, to get the cheapest fueling option) or distance preferences (such as, to get the closest fueling option). In an alternate example, a fueling station may be selected automatically by a controller based on the fueling profile selected by the operator.

At 322, it may be determined whether the fueling station is a "smart pump". In one example, a "smart pump" may be a fueling station enabled with wireless communication. If yes, then at 324, the selected fueling profile may be communicated to the selected fueling station. In one example, the engine controller may relay the selected fueling profile to the selected fueling station using wireless communication. At 326, in response to the communication, fuel may be received according to the fueling profile selected by the vehicle operator. Specifically, during refueling at the selected fueling station, a fuel type of the received fuel may be received wirelessly from the fueling station. Other fueling information received may include an amount, cost, brand, etc., of the fuel being received. At 328, the fuel information, such as the fuel type, of the received fuel may be displayed to the vehicle operator on the display device.

Optionally, during refueling at the selected fueling station, one or more control valves of the fuel system may be controlled based on the fuel type indication received from the fueling station. For example, when the received fuel is a first fuel type, a first control valve coupled to a first fuel tank may be opened while a second control valve coupled to a second fuel tank may be closed. Then, when the fuel being pumped and received is of the second fuel type, the first control valve may be closed while the second control valve may be opened. If the fueling station is not a "smart pump", the routine may end.

Example embodiments of displayed fueling profiles are depicted in FIG. 4. The displayed fueling profiles may be displayed on an interactive display device, such as on a vehicle dashboard.

First embodiment 400 shows a display 402 displaying one or more fueling profiles 408. Display 402 may be an interactive display configured to receive operator preferences from a vehicle operator (such as, on sub-display 404), while displaying one or more refueling profiles (such as, on sub-display 406). The one or more refueling profiles may be based on the received operator preferences and predicted future environmental conditions of a future vehicle trip plan. A controller may be configured to receive details of a vehicle future trip plan 401 (such as a trip planned immediately after refueling) from a vehicle positioning device, such as a GPS, on-board the vehicle. The future trip plan 401 received from the vehicle positioning device may include navigational inputs, such as positions of the vehicle along the travel route and at the destination, environmental information pertaining to the route, information pertaining to terrain, grade, altitude, and expected traffic, real-time traffic information, alternate routes available in case of congestion, etc. Based on the future trip plan 401 and navigational inputs received from the vehicle positioning device, future environmental conditions over the planned route may be determined. The predicted future environmental conditions may include information pertaining to ambient and forecasted temperatures, altitudes, pressures, humidity, forecasted weather conditions at the destination and along the planned travel route (such as a risk of rain, snow, storms, etc.).

A refueling indication may be received based on the fuel level in each fuel tank of the vehicle system. In the depicted example, the fuel system may be a dual fuel system with a first fuel tank storing gasoline and a second fuel tank storing E85. Individual fuel tank levels 403 may be displayed on sub-display 406. In one example, as shown, refueling may be requested in response to fuel levels in one or both tanks falling below respective thresholds. Operator preferences may be received in sub-display 404. For example, the operator may indicate a preference for vehicle performance, fuel economy, operational costs (miles/$), emissions ($CO_2$), etc. In the depicted example, the vehicle operator has indicated a preference for increased vehicle performance. Based on the predicted environmental conditions, and further based on the operator's preference for increased vehicle performance, one or more fueling profiles 408 may be displayed. Based on future trip plan 401, the predicted environmental conditions may include a high altitude, a low humidity (dry condition) and hot temperatures. Based on the predicted conditions, and fuel properties of the fuels in the tanks, fuel usage rates over the planned route for gasoline and E85 may be anticipated, and fueling profiles 408 may be accordingly displayed in sub-display 406. For example, in anticipation of a higher likelihood of knock in the high altitude, low humidity, and hot conditions predicted for future trip plan 401, and based on the knock-mitigating properties of E85, a higher rate of E85 usage may be predicted. Accordingly, fueling profile 408 may suggest refueling a higher amount of E85 and a lower amount of gasoline (relative to environmental conditions of higher humidity, lower temperature, or lower altitude, as shown in embodiment 450), such as 10 gallons of gasoline and 4 gallons of E85. The fueling profile 408 may also include a list of fueling stations capable of providing fuel according to the displayed ratio. A distance and/or location of the fueling stations may also be provided. For example, fueling profile 408 may indicate a first fueling station that is 3 miles away, a second fueling station 10 miles away, and third fueling station 12 miles away. The operator may select one of the displayed fueling stations by interacting with sub-display 406, and upon selection, driving directions to the selected fueling station may be displayed on sub-display 406.

In comparison, second embodiment 450 shows a display 452 displaying one or more fueling profiles 458 based on an alternate vehicle future trip plan 451. Herein, a refueling indication may be received based on the operator requesting refueling. The operator may request refueling through use of a refuel button on sub-display 454. In the depicted example, refueling may be requested by the operator even though individual fuel tank levels 453 displayed on sub-display 456 may indicate that fuel levels are not below their respective thresholds.

Predicted environmental conditions received for future trip plan 451 may include low altitude, high humidity and cooler temperatures. Operator preferences may be received in sub-display 454. In the depicted example, the vehicle operator has indicated a preference for fuel economy and reduced operational costs (miles/$). Based on the predicted conditions, the properties of the fuels (gasoline and E85), and the operator preferences, fuel usage rates over the planned route may be anticipated and refueling profiles 458 may be accordingly displayed in sub-display 456. For example, in anticipation of a lower likelihood of knock in the low altitude, high humidity, and cooler conditions, and based on the indicated preference for fuel economy, a lower rate of E85 usage may be predicted. Accordingly, the fueling profile may suggest refueling a lower amount of E85 and a higher amount of gasoline (relative to the refueling profile of embodiment 400), such as 12 gallons of gasoline and 1 gallon of E85. The refueling profile 458 may also include a list of fueling stations capable of providing fuel according to the displayed ratio. For example, the fueling profile 458 may indicate a first fueling station that is 2 miles away, a second fueling station 3 miles away, and third fueling station 5 miles away. The operator may select one of the displayed fueling stations and upon selection, driving directions to the selected fueling station may be displayed on sub-display 456.

In this way, refueling operations may be simplified for a vehicle operator while providing fuel to enable operator selected performance attributes. As such, this may improve customer satisfaction during vehicle operation.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle including a first fuel tank with a first fuel and a second fuel tank with a second, different, fuel, comprising,
displaying a fueling profile to a vehicle operator including suggested fuel amounts to be refilled for each of the first and second fuels, the fueling profile based on predicted future environmental conditions during a vehicle trip plan, and the suggested amounts based on operator preferences of performance and fuel economy.

2. The method of claim 1, wherein the predicted future environmental conditions include one or more of ambient temperature, ambient altitude, ambient pressure, ambient humidity, and weather conditions.

3. The method of claim 2, wherein the second fuel has a higher effective octane than the first fuel.

4. The method of claim 3, wherein the second fuel is primarily ethanol and the first fuel is primarily gasoline, and where the second fuel is directly injected to an engine cylinder.

5. A method of selectively fueling a vehicle including a first fuel tank with a first fuel and a second fuel tank with a second, different, fuel, comprising,
displaying a fueling profile to a vehicle operator, the fueling profile based on predicted future environmental conditions during a vehicle trip plan, the predicted future environmental conditions including one or more of ambient temperature, ambient altitude, ambient pressure, ambient humidity, and weather conditions, the displayed fueling profile including a fuel type, a fuel amount, a fuel ratio between the first fuel and the second fuel, one or more fueling stations, and directions to each of the one or more fueling stations.

6. The method of claim 5, wherein basing the fueling profile on predicted future environmental conditions includes increasing a fuel amount of the second fuel as the ambient temperature increases, the ambient humidity decreases, and/or the ambient altitude increases.

7. The method of claim 6, wherein the displayed fueling profile is further based on operator preferences including increased vehicle performance, increased fuel economy, reduced vehicle fueling costs, and/or reduced vehicle emissions, and additional predicted conditions including driver aggressiveness, road grade, trailer or other load.

8. The method of claim 7, wherein the predicted environmental conditions and additional predicted conditions are based on at least one of navigational inputs received from a vehicle positioning device in the vehicle, a recent history of driver behavior, and recent history of relative usage of the two fuels.

9. The method of claim 5, wherein the vehicle is navigated to a fueling station selected based on the displayed fueling profile, the method further comprising communicating the displayed fueling profile to the selected fueling station, and during refueling at the selected fueling station, receiving a fuel type of received fuel wirelessly from the fueling station, and displaying the fuel type of the received fuel to the vehicle operator.

10. The method of claim 9, further comprising, opening a first control valve coupled to the first fuel tank while closing a second control valve coupled to the second fuel tank when the received fuel is a first fuel type; and opening the second control valve while closing the first control valve when the received fuel is a second fuel type.

11. The method of claim 5, wherein the selective fueling is performed in response to a fuel level in the first fuel tank falling below a first threshold, a fuel level in the second fuel tank falling below a second threshold, and/or the vehicle operator requesting refueling.

12. A method of selectively fueling a vehicle including a first fuel tank with a first fuel and a second fuel tank with a second, different, fuel, comprising,
displaying a fueling profile to a vehicle operator via an interactive display device, the fueling profile based on predicted future environmental conditions during a vehicle trip plan, the predicted future environmental conditions including one or more of ambient temperature, ambient altitude, ambient pressure, ambient humidity, and weather conditions, the displayed fueling profile including a fuel type, a fuel amount, a fuel ratio between the first fuel and the second fuel, one or more fueling stations, and directions to each of the one or more fueling stations.

13. The method of claim 12, wherein the second fuel has a higher effective octane than the first fuel.

14. The method of claim 13, wherein the second fuel is primarily ethanol and the first fuel is primarily gasoline, and where the second fuel is directly injected to an engine cylinder.

15. The method of claim 12, wherein basing the fueling profile on predicted future environmental conditions includes increasing a fuel amount of the second fuel as the ambient temperature increases, the ambient humidity decreases, and/or the ambient altitude increases.

16. The method of claim 15, wherein the displayed fueling profile is further based on operator preferences including increased vehicle performance, increased fuel economy, reduced vehicle fueling costs, and/or reduced vehicle emissions, and additional predicted conditions including driver aggressiveness, road grade, trailer or other load, and wherein the predicted environmental conditions and additional predicted conditions are based on at least one of navigational inputs received from a vehicle positioning device in the vehicle, a recent history of driver behavior, and recent history of relative usage of the two fuels.

17. The method of claim 12, the method further comprising communicating the displayed fueling profile to the selected fueling station, and during refueling at the selected fueling station, receiving a fuel type of received fuel wirelessly from the fueling station, and displaying the fuel type of the received fuel to the vehicle operator.

18. The method of claim 17, further comprising, opening a first control valve coupled to the first fuel tank while closing a second control valve coupled to the second fuel tank when the received fuel is a first fuel type; and opening the second control valve while closing the first control valve when the received fuel is a second fuel type.

* * * * *